(12) United States Patent
Zhan et al.

(10) Patent No.: US 9,046,026 B2
(45) Date of Patent: Jun. 2, 2015

(54) PARTICULATE OXIDATION CATALYST WITH DUAL PRESSURE-DROP SENSORS

(75) Inventors: Rijing Zhan, San Antonio, TX (US); Phillip A. Weber, Fair Oaks Ranch, TX (US); Michael A. Chadwell, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 245 days.

(21) Appl. No.: 13/491,758

(22) Filed: Jun. 8, 2012

(65) Prior Publication Data

US 2013/0327019 A1    Dec. 12, 2013

(51) Int. Cl.
| | |
|---|---|
| *F01N 11/00* | (2006.01) |
| *F01N 3/20* | (2006.01) |
| *F01N 3/10* | (2006.01) |
| *F01N 9/00* | (2006.01) |
| *F01N 3/035* | (2006.01) |
| *F01N 13/00* | (2010.01) |

(52) U.S. Cl.
CPC .............. *F01N 11/002* (2013.01); *Y02T 10/47* (2013.01); *F01N 3/106* (2013.01); *F01N 9/002* (2013.01); *F01N 3/035* (2013.01); F01N 2560/08 (2013.01); F01N 2900/1406 (2013.01); *F01N 13/0097* (2014.06); *F01N 13/0093* (2014.06)

(58) Field of Classification Search
CPC .............. F01N 11/002; F01N 13/0093; F01N 13/0097; F01N 3/035; F01N 3/106; F01N 9/002
USPC ............................................ 60/274, 295, 297
See application file for complete search history.

(56) References Cited

U.S. PATENT DOCUMENTS

| | | | |
|---|---|---|---|
| 6,516,611 B1 * | 2/2003 | Schafer-Sindlinger et al. ................................ | 60/297 |
| 7,207,171 B2 * | 4/2007 | Nagaoka et al. ................ | 60/295 |
| 2002/0112472 A1 * | 8/2002 | Tashiro et al. .................. | 60/295 |
| 2007/0068147 A1 * | 3/2007 | Sun et al. ........................ | 60/297 |
| 2008/0104948 A1 * | 5/2008 | Kapparos et al. ............... | 60/297 |

* cited by examiner

*Primary Examiner* — Kenneth Bomberg
*Assistant Examiner* — Brandon Lee
(74) *Attorney, Agent, or Firm* — Chowdhury & Georgakis PC; Ann C. Livingston

(57) ABSTRACT

A method and system for treating exhaust emitted via an exhaust line from a diesel engine. A POC system is installed on the exhaust line, and has at least one diesel oxidation catalyst (DOC), a set of two or more particulate oxidation catalyst (POC) elements, a first differential pressure sensor (ΔP1) to measure the pressure difference across the first and all but the last POC elements, and a second differential pressure sensor (ΔP2) to measure pressure differences across the last POC element. During operation of the engine, ΔP1 is monitored to determine whether its POC elements require active regeneration, and ΔP2 is separately monitored to determine whether its (the last) POC element requires active regeneration.

8 Claims, 3 Drawing Sheets

PARTICULATE OXIDATION CATALYST WITH DUAL PRESSURE-DROP SENSORS

TECHNICAL FIELD OF THE INVENTION

This invention relates to control of exhaust emissions from diesel engines, and more particularly to particulate oxidation catalyst aftertreatment devices.

BACKGROUND OF THE INVENTION

Particulate matter (PM) emissions from diesel engines are regulated in the Unites States, Europe Union, Japan, China, India and other countries. Particulate matter is mainly comprised of soot, which is formed in the engine through incomplete combustion. SOF (soluable organic fraction) condensates may form on soot particles during exhaust gas cooling and dilution. Sulfates and water can also be found in diesel particulate matter.

To meet PM emissions regulations, diesel particulate filters (DPF) provide the primary approach to exhaust aftertreatment. There are two main DPF technologies, namely wall-flow DPFs and particulate oxidation catalysts (POCs). Diesel oxidation catalysts can reduce SOF condensates if designed to do so, but are not considered primary PM control devices.

Wall-flow DPFs typically provide PM reduction efficiencies greater than 90%. However, wall-flow DPFs require regular active regenerations to remove accumulated PM and thereby avoid blockage of the DPF.

POCs have PM reduction efficiencies in the range of 20% to 80%, depending on engine operating conditions, fuel quality, and the PM loading level within the POC. The objective of using a POC is not necessarily to equal the high efficiencies of a wall-flow DPF, but to achieve good PM reduction with a lessened need for active regeneration.

For POC's, to effectively reduce PM over an extended engine or vehicle operation time, e.g., over the lifetime of the engine, active regeneration may be necessary. A differential pressure sensor ($\Delta P$ sensor) is commonly used as an input to trigger POC regeneration.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to using dual differential pressure ($\Delta P$) sensors to provide input parameters for active regeneration of a particulate oxidation catalyst (POC). The dual $\Delta P$ sensors may also be used as an on-board diagnostic (OBD) tool. The system and method described herein maintain acceptable efficiency for PM reduction, while preventing PM "blow-off" from the POC system.

Figure 1:
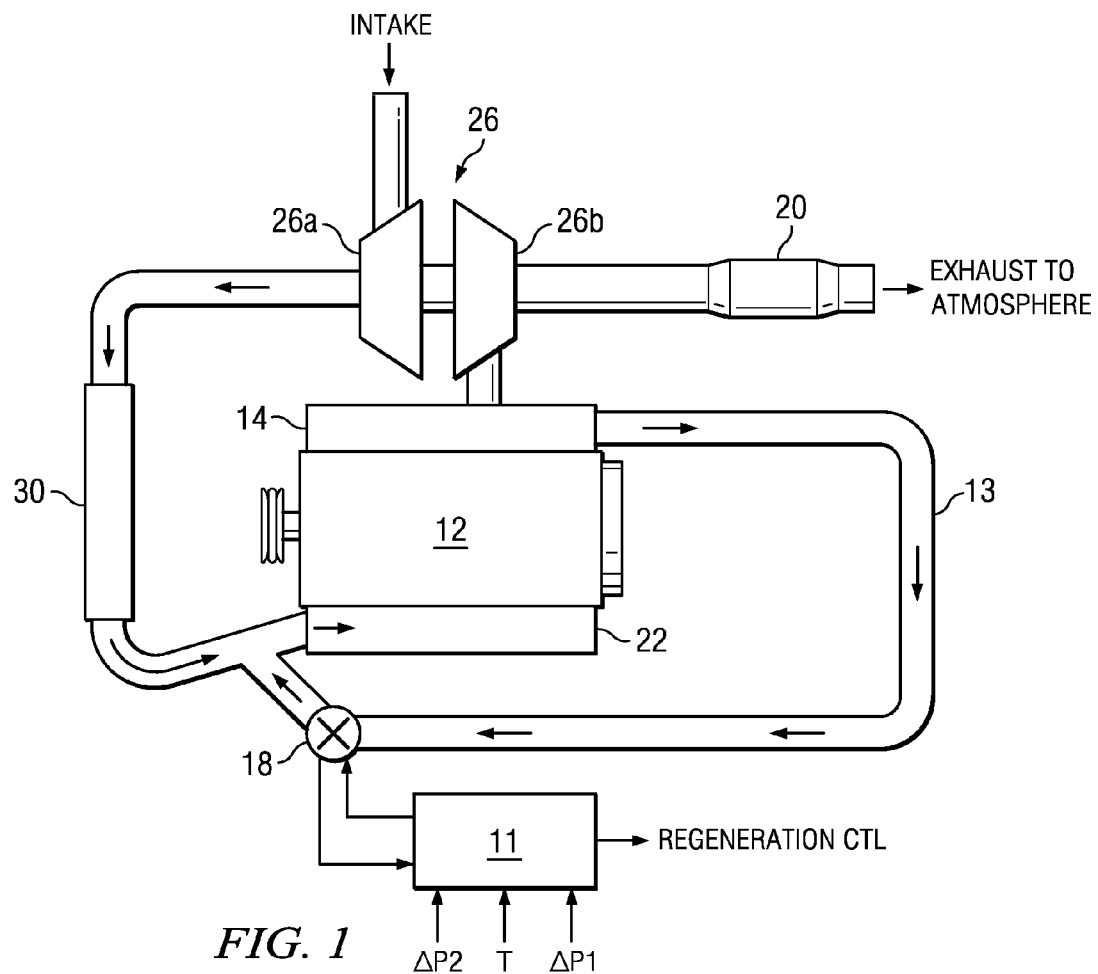
FIG. 1 illustrates a diesel engine having a POC exhaust aftertreatment system in accordance with the invention.

FIG. 1 illustrates a diesel engine system having a POC exhaust aftertreatment system 20 in accordance with the invention. Although this description is in terms of an internal combustion engine of the type commonly used in automobiles, the aftertreatment system 20 and its method of operation are suitable for treating exhaust from any diesel, gasoline, or alternative fuel engine, whether used for on-road or off-road applications.

In the illustrative embodiment, the diesel engine system has a diesel engine 12, an exhaust gas recirculation (EGR) loop 13, and is an air-boosted system having a turbocharger 26. The direction of flow of exhaust gas through the EGR loop 13 is indicated by directional arrows. Exhaust gas discharged from the engine's exhaust manifold 14 is directed through the EGR loop 13, which may include a filter and/or heat exchanger (not shown). The recirculated exhaust gas flows to an EGR valve 18, and then to the engine's intake manifold 22 where it is mixed with fresh intake air.

The engine's intake air is compressed by the turbocharger's compressor 26a, which is mechanically driven by its turbine 26b. Desirably, the compressed air discharged from the compressor 26a is cooled through an intercooler 30 positioned between the compressor 26a and the intake manifold 22.

The POC exhaust aftertreatment system 20 (hereinafter referred to as the "POC system") is further explained below, and is typically installed in-line on an under-floor exhaust line. The treated exhaust exits the POC system 20 into the atmosphere via the tailpipe.

Although not explicitly shown in FIG. 1, engine system has some means for on-board active regeneration of the POC elements of the POC system 20. Alternatively, active regeneration could be performed off-board by removing the POC system 20. Most active regeneration techniques involve introducing very high heat into the exhaust system, and can be implemented with a variety of strategies.

Control unit 11 may be processor-based, programmed to control various aspects of engine operation as described herein. In general, control unit 11 may be implemented with various controller devices. Further, control unit 11 may be part of a more comprehensive engine control unit that controls various other engine and/or emissions devices.

Control unit 11 is programmed to receive input signals and provide control output signals, in the manner described below. As further explained below, control unit 11 receives differential pressure measurement signals, $\Delta P1$ and $\Delta P2$, from two $\Delta P$ sensors that are part of the POC system. It may also receive a temperature measurement signal, T. It delivers an activation signal to whatever means of active regeneration is used for the POC elements of the POC system 20.

Figure 2:
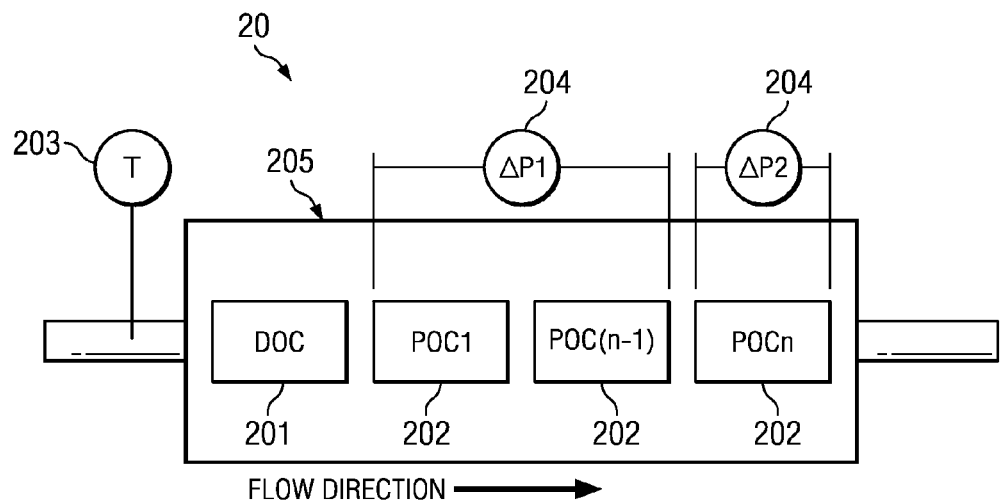
FIG. 2 illustrates the POC system of FIG. 1 in further detail.

FIG. 2 illustrates one embodiment of POC system 20. POC system 20 has one or more diesel oxidation catalysts 201 (hereinafter referred to as "DOC" although there may be more than one), at least two particulate oxidation catalysts 202 (hereinafter referred to as "POCs"), at least one temperature sensor 203, and two $\Delta P$ sensors 204. The direction of flow of exhaust through the POC system 22 is indicated by the arrow.

The DOC 201 and the multiple (minimum of two) POCs 202 may be installed within the same housing 205. Alternatively, separate housings could be used for the individual DOC and POC elements or any grouping of these elements. Housings for exhaust aftertreatment devices are commonly referred to as "cans".

DOC 201 is located upstream of POCs 202. DOC 201 may be any one of known or to be developed diesel oxidation catalysts. DOCs operate to remove carbon monoxide (CO) and hydrocarbons (HC) from the exhaust gas stream by combination with oxygen, as well as to convert NO to NO2. This reaction is suitable for oxygen-rich (lean) exhaust gas streams, typical of diesel exhaust. An example of a suitable DOC 201 is a flow-through device with a platinum or other precious metal formulation.

POCs 202 are placed in-line downstream DOC 201. As indicated in FIG. 2, there are n POCs, where n is any number equal to or greater than two. POCs 202 may be any one of various POC designs, known or to be developed. In general, each POC 202 has a filter structure, with the filter developed to trap PM. The reaction within the POC may be expressed as C+NO2=>NO+CO2. An example of a suitable POC is a flow-through filter coated with a specific catalyst, although a POC 202 could also comprise a bare filtering substrate.

POCs 202 are designed to accomplish "full time passive regeneration" so that no elevated temperature is required to burn off PM. However, due to various engine operating conditions, the system and method described herein include means for initiating "active regeneration" as described above.

The DOC 201 and POCs 202 cooperate, with the DOC 201 providing oxidation of HC and CO, partial oxidation of VOF, and NO2 formation for regeneration. The POCs 202 provide additional oxidation of HC and CO, additional oxidation of VOF, and NO2 formation and use for soot oxidation (passive regeneration).

Temperature sensor 203 may be implemented with any one of various temperature sensing devices. An example of a suitable temperature sensor 203 is a thermocouple. Temperature sensor 203 is installed at the inlet of the entire POC system 22. It may be installed in the exhaust pipe as shown in FIG. 2. Alternatively, it may be installed within the housing 204 upstream of the front face of the first DOC 201. The temperature measured is the inlet temperature, T, of the POC system 20, i.e., DOC-in.

POC system 20 has two differential pressure ($\Delta P$) sensors 204. These sensors 204 may be of various types known or to be developed, suitable for measuring pressure drops across filters, aftertreatment catalysts, or the like. This type of sensor measures the difference between two pressures, one on each side of the sensor.

As illustrated, a first $\Delta P$ sensor ($\Delta P1$) is used to measure the pressure drop from the first POC 202 to the second-to-last POC 202 (herein referred to as the "upstream POCs" although there may be only one). In the example of FIG. 2, the upstream POC or POCs are identified as POC1 through POC (n−1). The second $\Delta P$ sensor ($\Delta P2$) measures the pressure drop across POCn (the last POC).

In other embodiments, $\Delta P1$ could be placed across the combination of DOC 201 and POC1 through POCn−1. Also, in other embodiments, additional $\Delta P$ sensors may be used to monitor each individual DOC 201 or POC 202, or the combination of two or more DOCS, two or more POCs, or any numbers of the DOC and POC combinations.

Figure 3:
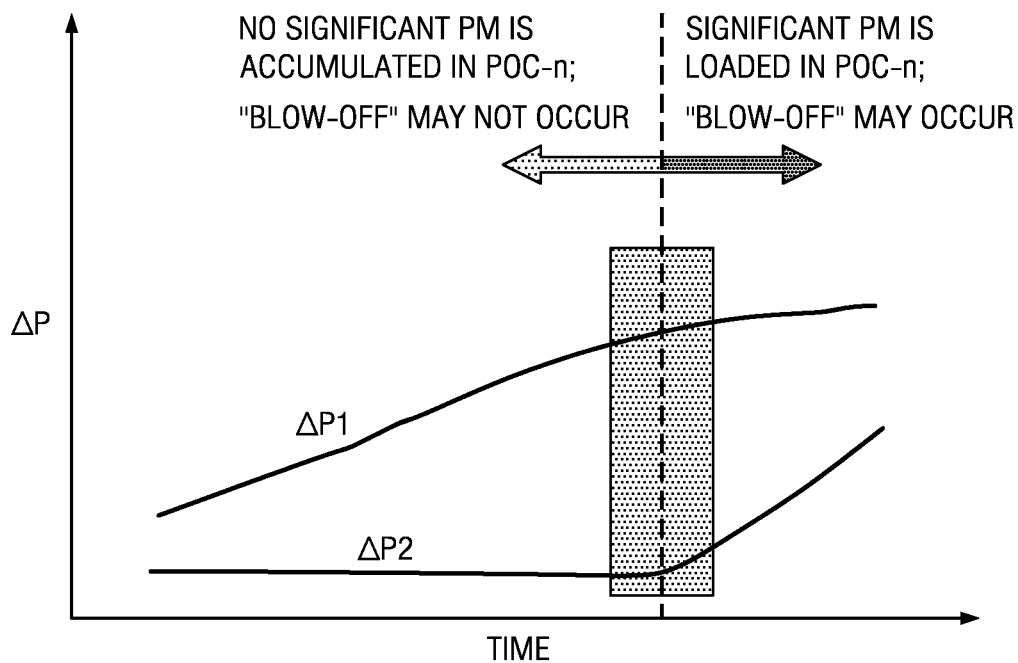
FIG. 3 illustrates the operation of the POC system.

FIG. 3 illustrates how the POC system 22 is used to trigger active POC regeneration. It also prevents "blow-off" under steady-state engine operating conditions, when the POC system 20 may not be able to fully regenerate passively.

It is assumed that the method begins with a clean POC system 20. That is, there is no PM or there is only a negligible level of PM in the POC system 20.

If the POC system 20 cannot regenerate passively, $\Delta P1$ increases over time due to an increased PM load level. At relatively low PM loading levels, POC1 through POC(n−1) have relatively high PM efficiency. This results in insignificant PM accumulated in POCn (the last POC). Therefore, $\Delta P2$ remains constant or has a significantly lower rate of increase than $\Delta P1$ under steady-state engine operating conditions.

When a high level of PM is loaded at POC1 through POC (n−1), more PM may break through these upstream POCs and accumulate at POCn. As a result, A$\Delta P2$ increases.

When the last POC (POCn) reaches a certain PM loading level, e.g., its maximum PM capacity, PM can break through the entire POC system and be emitted from the tailpipe. Such a PM breakthrough may be intensified when the exhaust flow rate increases abruptly (e.g., under harsh acceleration conditions), resulting in POC "blow-off".

If an active regeneration of POCn is forced before significant PM is accumulated at POCn, POC "blow-off" may be prevented. This is accomplished by ensuring that active regeneration has been performed before $\Delta P2$ exceeds a predetermined threshold. If $\Delta P2$ maintains a constant or near constant value unless active regeneration is required, the threshold for active regeneration may be a predetermined deviation from this constant value. Alternatively, the threshold may be a faster than normal increase in its loading rate.

Thus, in accordance with the above, the upstream $\Delta P1$ sensor is used to monitor the upstream POCs 202 to determine whether they require active regeneration. The downstream $\Delta P2$ sensor is used to determine whether "blow-off" conditions exist at POCn, and if so, to provide active regeneration for POCn. In normal conditions (conditions not indicating "blow-off"), $\Delta P2$ should maintain a constant or near constant value.

It should be noted that when active regeneration of the upstream POC(s) (POC1 through POCn−1) or the last POC (POCn) is called for, this could be performed by regenerating either of these groups separately or both groups together. The particular active regeneration process may determine whether separate regeneration is possible. If active regeneration of separate POC elements or groups is possible, the control signal from the control unit 11 may differentiate between active regeneration of POC1 through POCn−1 and active regeneration of POCn.

Referring again to FIG. 2, POC system 20 has a temperature sensor 203 as well as dual $\Delta P$ sensors 204. The DOC-in temperature measurement, T, is critical in determining if an active regeneration is needed. The DOC-in temperature measured by sensor 203 and delivered to control unit 11 is another parameter for building a "PM model" of the entire POC system 20.

For example, if the DOC-in temperature, T, is continuously low (e.g., below the "light-off" temperature of DOC 201), more PM is accumulated in the POC system 20, and it may be potentially plugged. On the other hand, if DOC-in temperature is continuously high, PM can be oxidized by the POC system, passive regeneration is achieved, and active regeneration may not be needed.

Figure 4:
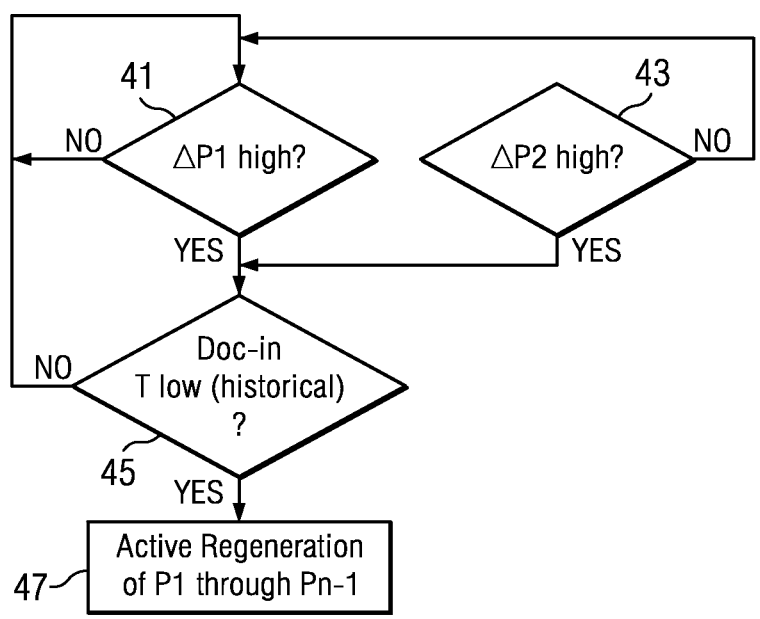
FIG. 4 illustrates a method of using a POC system having dual $\Delta P$ sensors and a temperature sensor.
Figure 5:
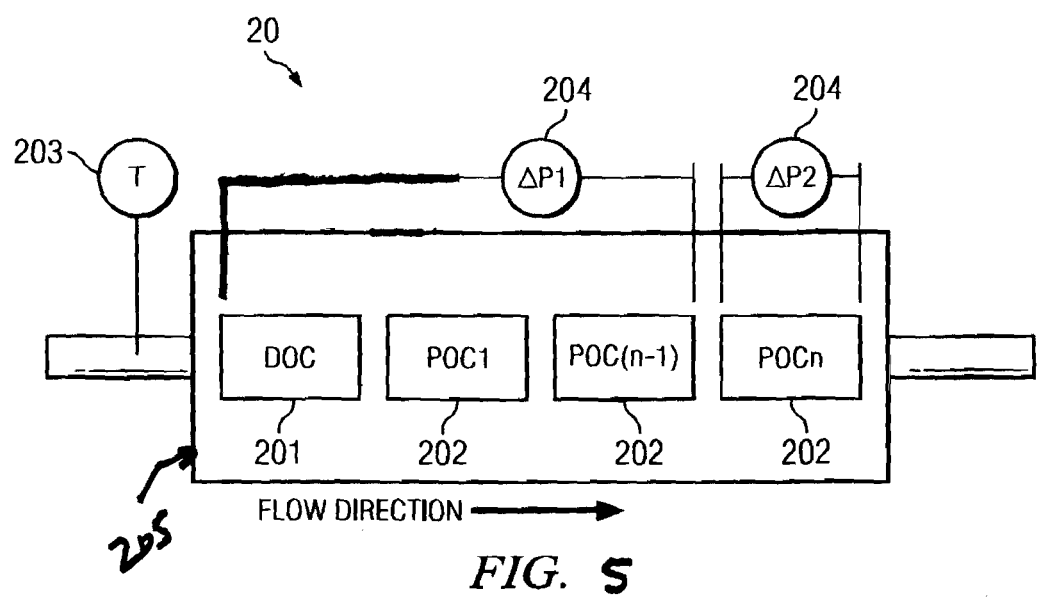
FIG. 5 illustrates another embodiment of the POC system of FIG. 1.

FIG. 4 illustrates a method of using POC system 20. This method may be implemented with appropriate programming and stored data of control unit 11. In Steps 41 and 43, both $\Delta P1$ and $\Delta P2$ are continuously monitored. If either pressure difference measurement is "high" as compared to a stored reference value, in Step 45, data acquired from temperature sensor 203 is accessed to determine whether the DOC-in temperature has been too low to provide passive regeneration. If so, in Step 47, active regeneration of the POC system 20 (or one or more individual POC elements) is performed.

In other embodiments, if $\Delta P2$ is sufficiently high that blow-out appears imminent, Step 45 could be bypassed.

For some active regeneration techniques, the current DOC-in temperature measurement may important to determine the timing of the active regeneration. For example, with active regeneration techniques in which additional diesel fuel is used to initiate the active regeneration, the diesel fuel should be introduced only if the DOC-in temperature is above a "light-off" temperature. If the DOC-in temperature is too low, some or all of the introduced diesel fuel may pass through POC system 20 and emits from the exhaust line into the atmosphere or it may be accumulated in POC system 20. In the latter case, the fuel can quickly burn when the DOC-in temperature reaches a light-off condition (such as due to an engine operating condition change). This can easily melt the POC system's DOC and POC elements. Thus, although not shown in FIG. 4, if active regeneration is called for in Step 47, an additional step could be performed to delay active regeneration until the DOC-in temperature is sufficiently high.

What is claimed is:

1. A method of treating the exhaust from a diesel engine having an exhaust line from the engine, and having an exhaust aftertreatment system on the exhaust line comprising in the following order: at least one diesel oxidation catalyst, a set of one or more upstream particulate oxidation catalysts, and a last particulate oxidation catalyst, the upstream particulate oxidation catalysts and the last particulate oxidation catalyst being operable to be actively regenerated with heat applied to the exhaust aftertreatment system; the method comprising:
    measuring pressure differences across the upstream particulate oxidation catalysts, using a first differential pressure sensor, repeatedly during operation of the engine;
    measuring pressure differences across the last particulate oxidation catalyst, using a second differential pressure sensor, repeatedly during operation of the engine;
    actively regenerating the upstream particulate oxidation catalysts when the pressure difference across the upstream particulate oxidations catalysts is above a predetermined pressure difference threshold; and
    actively regenerating the last particulate oxidation catalyst when the pressure difference across the last particulate oxidation catalyst deviates from a constant or near constant value that is near the initial pressure difference value of the last particulate oxidation catalyst in a clean condition and that is lower than the predetermined pressure difference threshold.

2. The method of claim 1, wherein the set of one or more upstream particulate oxidation catalysts comprises a single particulate oxidation catalyst element.

3. The method of claim 1, wherein the set of one or more upstream particulate oxidation catalysts comprises more than one particulate oxidation catalyst element.

4. The method of claim 1, further comprising the step of using a temperature sensor to determine whether the temperature at the diesel oxidation catalyst indicates that passive regeneration of the particulate oxidation catalysts has occurred.

5. The method of claim 1, wherein the first differential pressure sensor measures the pressure difference across the diesel oxidation catalyst as well as across the upstream particulate oxidation catalysts.

6. A particulate oxidation catalyst system for treating exhaust emitted via an exhaust line from a diesel engine, comprising:
    an exhaust aftertreatment system comprising: at least one diesel oxidation catalyst on the exhaust line; a set of one or more upstream particulate oxidation catalysts in-line downstream of the at least one diesel oxidation catalyst; a last particulate oxidation catalyst downstream of the upstream particulate oxidation catalysts;
    a first differential pressure sensor to measure pressure differences across the upstream particulate oxidation catalysts;
    a second differential pressure sensor to measure pressure differences across the last particulate oxidation catalyst;
    a processor-based controller operably connected to the first and second differential pressure sensors and to the engine, the controller having control logic that when executed causes the controller to: during operation of the engine, monitor the output of the first differential pressure sensor to determine whether the upstream particulate oxidation catalysts require active regeneration, to monitor the output of the second differential pressure sensor to determine whether the last particulate oxidation catalyst requires active regeneration, to deliver a control signal to initiate heat for active regeneration of the upstream particulate oxidation catalysts when the output of the first differential pressure sensor represents a pressure drop above a predetermined pressure difference threshold, and to deliver a control signal to the engine and/or to the exhaust aftertreatment system to cause heat for active regeneration of the last particulate oxidation catalyst when the output of the second differential pressure sensor represents a pressure drop deviation from a constant or near constant value that is near the pressure differential across the last particulate oxidation catalyst in a clean condition and that is lower than the predetermined pressure difference threshold.

7. The system of claim 6, further comprising a housing containing the at least one diesel oxidation catalyst, the upstream particulate oxidation catalysts and the last particulate oxidation catalyst.

8. The system of claim 6, wherein the first differential pressure sensor measures the pressure difference across the at least one diesel oxidation catalyst as well as across the upstream particulate oxidation catalysts.

* * * * *